Oct. 13, 1959    J. J. DAMON    2,908,284
SHOCK ABSORBER VALVE
Filed Dec. 31, 1954    2 Sheets-Sheet 1
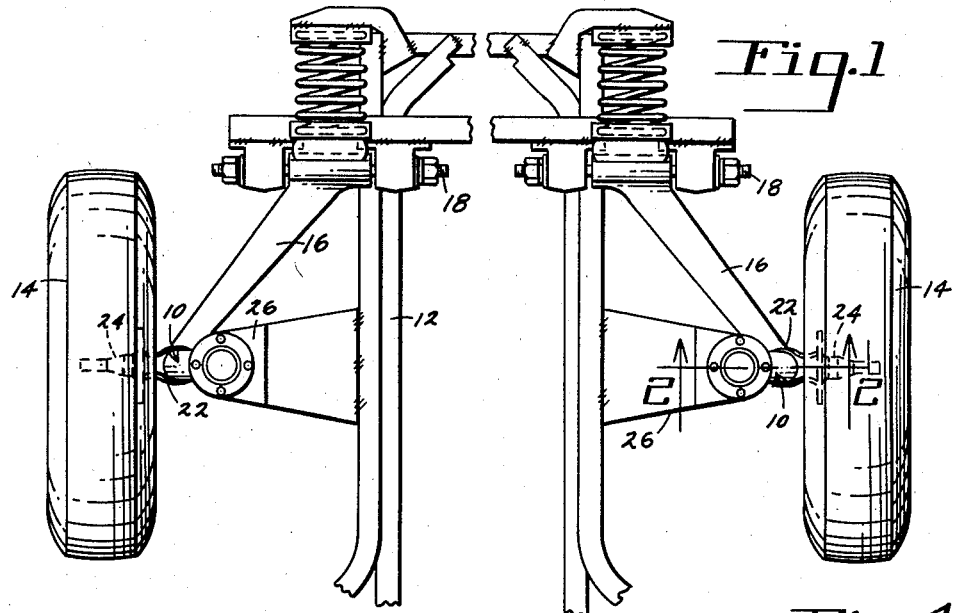
Fig.1
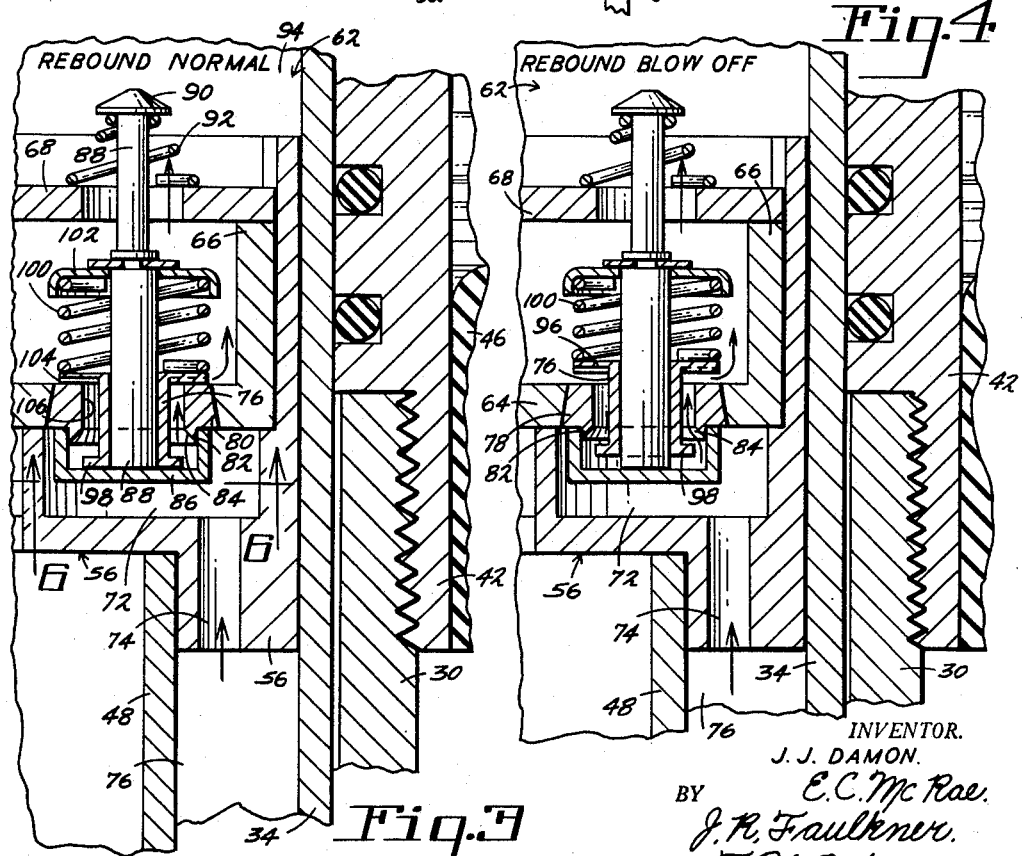
Fig.4
Fig.3
INVENTOR.
J. J. DAMON.
BY E. C. McRae.
J. R. Faulkner.
F. H. Oster. ATTYS.

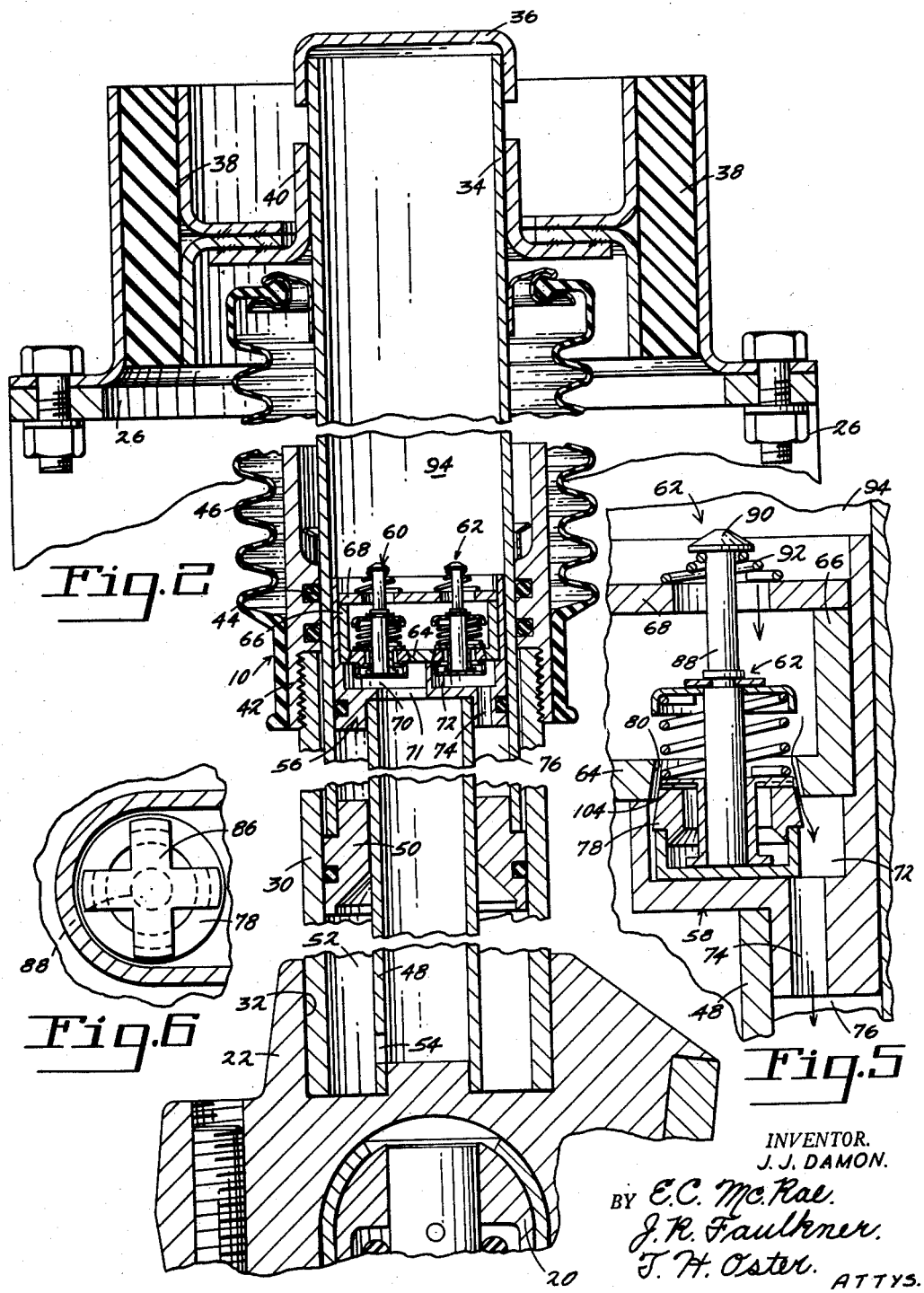

United States Patent Office 2,908,284
Patented Oct. 13, 1959

2,908,284
SHOCK ABSORBER VALVE

James J. Damon, Dearborn, Mich., assignor to Ford Motor Company, Dearborn, Mich., a corporation of Delaware Application December 31, 1954, Serial No. 478,951

1 Claim. (Cl. 137—493.3)

This invention relates generally to motor vehicles, and particularly to a hydraulic shock absorber for motor vehicles.

An object of the present invention is to provide a shock absorber for a motor vehicle incorporating a unitary valve asembly not only providing for the passage of fluid therethrough in one direction for replenishment purposes but also providing for restricted flow therethrough in the opposite direction during normal operation and an increased flow therethrough in said opposite direction under blow-off conditions resulting from high velocity operation of the shock absorber.

Another object of the present invention is to provide a shock absorber incorporating a pair of similar valve assemblies permitting a reversal of fluid flow therethrough during compresion and rebound strokes of the shock absorber, thus providing an economical and efficient construction.

Still another object of the present invention is to provide a shock absorber having a valve assembly incorporating means affording a variable restriction to the fluid flow through the valve at high velocity during the blow-off operation. In an embodiment of the invention the valve is provided with an annular flange or shoulder which is normally inoperative but which is moved during blow-off operation into a position restricting the flow of fluid through the valve with the restriction being variable depending upon the velocity of the fluid flow and the movement of the valve from its seat under blow-off conditions.

Other objects and advantages of this invention will be made more apparent as this description proceeds, particularly when considered in connection with the accompanying drawings, wherein:

Figure 1 is a fragmentary plan view of the forward portion of a motor vehicle chassis incorporating a combined shock absorber and telescopic control member constructed according to the present invention.

Figure 2 is an enlarged vertical cross sectional view taken substantially on the plane indicated by the line 2—2 of Figure 1.

Figure 3 is an enlarged cross sectional view of a portion of the construction shown in Figure 1, showing one of the valve assemblies therefor.

Figure 4 is a cross sectional view similar to Figure 3, but showing the position of the valve during blow-off conditions.

Figure 5 is a cross sectional view similar to Figure 3, but illustrating the position of the valve during replenishing conditions.

Figure 6 is a cross sectional view taken on the plane indicated by the line 6—6 of Figure 3, and showing a bottom plan view of one of the valve assemblies.

Although the shock absorber valve assembly of the present invention may be incorporated in various types of shock absorbers, it is shown herein as being incorporated into a combined hydraulic shock absorber and telescopic control member 10 of the type shown in the patent application filed concurrently with Serial No. 479,181 now Patent No. 2,815,099 herewith in the names of John G. McQuaid and George H. Muller, entitled, "Shock Absorber," and having a common assignee with the present invention.

Referring to Figure 1, the reference character 12 indicates the frame of a motor vehicle chassis having front road wheels 14. A pair of suspension arms 16 of the trailing arm type are pivotally supported upon the vehicle frame 12 for rotation about horizontal transversely extending pivot shafts 18. Each trailing suspension arm 16 is connected at its rearward end by means of a ball joint 20 to a spindle support 22 having a spindle portion 24 rotatably supporting the adjacent road wheel 14. A telescopic tubular shock absorber 10 is supported at its lower end upon each spindle support 22 and is pivotally connected at its upper end to the frame bracket 26. It will be seen that the trailing suspension arms 16 and the shock absorbers 10 cooperate to support and guide the road wheels 14 during their rising and falling movements with respect to the vehicle frame.

Referring now particularly to Figure 2, the shock absorber 10 comprises a lower cylinder 30 supported within a socket 32 in the spindle support 22. Telescopically received with the lower cylinder 30 is an upper cylinder 34 closed at its upper end by an end cap 36. The upper cylinder 34 is connected to the vehicle frame bracket 26 by means of a rubber mount 38 having a flange 40 welded to the cylinder. A ring 42 is threadedly connected to the upper end of the lower cylinder 30 and carries sealing rings 44 engageable with the upper cylinder 34. A boot 46 extends between the ring 42 and the upper cylinder 34.

Concentrically located within the lower cylinder 30 is a central tube 48 rigidly connected at its lower end to the spindle support 22. Reciprocable within the annular space within the central tube 48 and the lower cylinder 30 is an annular piston 50 rigidly carried by the lower end of the upper cylinder 34. An annular chamber 52 is thus formed between the lower cylinder 30 and the central tube 54 beneath the annular piston 50, and this chamber is placed in communication with the interior of the tube 48 by means of an opening 54 in the wall of the central tube 48 adjacent its lower end.

A valve block 56 is reciprocable within the upper cylinder 34 and is carried by the upper end of the central tube 48. The valve block 56 carries a pair of control valves 60 and 62 on opposite sides of the axis of the valve block. The valves 60 and 62 are supported upon the bottom wall 64 of a cup-shaped member 66 sleeved within the upper portion of the valve block 56 and held in place by a retaining plate 68.

The control valve 60 is positioned above a cylindrical cavity 70 formed in the valve block 56 and communicating with the interior of the central tube 48. The valve 62 is positioned above a cylindrical cavity 72 in the valve block 56 which communicates by means of an axially extending passageway 74 to the annular chamber 76 formed between the upper cylinder 34 and the central tube 48 and located between the valve block 56 and the annular piston 50.

The control valves 60 and 62 are identical, and consequently only one will be described in detail, reference being made to the enlarged cross sectional view of the valve 62 shown in Figure 3.

The valve assembly 62 comprises inner and outer valve members 76 and 78. The outer valve member 78 is in the form of an annular ring having a tapered outer surface engageable with a correspondingly tapered opening 80 in the lower wall 64 of the cup-shaped member 66 carried by the valve body 56. An annular extension 82 is formed on the bottom of the valve member 78 and is formed with a conical bore 84, for a purpose to be described more in detail hereinafter.

A cross shaped retainer 86, see Figure 6, engages the outer valve member 78, and is also secured to the lower end of an axially extending valve rod 88. The valve rod 88 has an enlarged head 90 formed at its upper end engaging a relatively light coil spring 92 seated upon the upper retaining plate 68 of the valve block 56, to urge the outer valve member 78 in an upward direction into seating engagement with the tapered valve seat 80.

As shown in Figure 5, the outer valve 78 may be moved downwardly to an open position against the action of coil spring 92 to permit fluid to flow from the reservoir chamber 94 through the valve seat 80 to the cylindrical cavity 72 formed in the valve block 56 and thence through the axial passageway 74 to the chamber 76.

Referring again to Figure 3, it will be noted that the inner valve member 76 is slidably mounted on the valve rod 88 and is formed with upper and lower flanges 96 and 98 respectively. A relatively heavy spring 100 surrounds the valve rod 88 between a spring retainer 102 and the upper flange 96 of the inner valve 76 to urge the valve member 76 downwardly until the flange 96 thereof seats against the upper surface of the outer valve member 78. The upper flange 96 is formed with a plurality of radially extending grooves 104 on its lower surface providing restricted communication with the annular space 106 between the inner and outer valve members 76 and 78. Thus, in the position of the valve shown in Figure 3, communication is established between the reservoir chamber 94 and the lower annular chamber 76 through the restriction afforded by the radial grooves 104.

During the compression stroke of the shock absorber, as shown in Figures 2 and 3, as during jounce of the road wheel 14, the lower cylinder 30 and the central tube 48, together with the valve block 56 carried thereby, are moved upwardly with respect to the upper cylinder 34. Fluid under pressure is forced from the annular chamber 52 beneath the piston 50 through the port 54 in the wall of the tube 48 and through the tube to cylindrical cavity 71 in the valve block 56. The fluid is then forced through the restriction afforded by the radial grooves 104 in the upper flange 96 of the inner valve 76 of control valve 60 and thence through the perforated plate 68 to the reservoir 94.

As shown in Figure 4, in the event of extreme pressures the inner valve 76 may be moved upwardly against the action of the coil spring 100 to lift the upper flange 96 of the valve away from its seat on the upper surface of the outer valve 78. Under these blow-off conditions, a greater quantity of fluid can be passed through the valve to the reservoir. It will be noted, however, that as the inner valve member 76 moves upwardly during blow-off, the lower flange 98 provides a variable restriction for the conical opening 84 formed in the lower annular flange 82 of the outer valve member 78.

During the compression stroke fluid from the reservoir 94 passes through the control valve 62 to replenish the annular chamber 76 between the valve block 56 and the piston 50 since this chamber is increasing in size during the compression stroke. In the event the fluid flow through the restricted radial grooves 104 is insufficient to completely fill the chamber 76, the outer valve member 78 may be unseated, as shown in Figure 5, against the action of coil spring 92, to permit additional fluid to flow from the reservoir through the tapered valve seat 80 to the chamber 76. Coil spring 92 is relatively light, permitting the valve member 78 to be readily opened to permit this fluid transfer.

The control valves 60 and 62 function in the reverse manner during a rebound stroke. During rebound the lower cylinder 30 and central tube 48 are moved downwardly relative to the upper cylinder 34 and the piston 50 to apply pressure to the fluid within the annular chamber 76 and to force this fluid through the passageway 74 and cavity 72 to the control valve 62. Hereagainst restricted flow is permitted through the radial grooves 104 in the manner illustrated in Figure 3, and additional flow may be had under blow-off conditions by raising the valve member 76 from its seat, as shown in Figure 4. Once again a variable restriction control is provided by the lower flange 98 of the inner control members 76 as it moves with respect to the conical seat 84. During the rebound stroke the annular chamber 52 beneath the piston 50 may be replenished from the reservoir by fluid flow through the control valve 60, in the manner previously described in connection with control valve 62. The valves 60 and 62 are thus identical in construction and operate in complementary fashion during compression and rebound strokes of the shock absorber.

It will be understood that the invention is not to be limited to the exact construction shown and described, but that various changes and modifications may be made without departing from the spirit and scope of the invention, as defined in the appended claim.

What is claimed is:

In a motor vehicle hydraulic shock absorber, a valve body having a partition wall therein, said wall having a circular tapered passageway extending therethrough forming a valve seat, an annular valve disc having a tapered peripheral surface adapted to engage said valve seat and having a bore extending axially through, a valve member extending through said passageway and having a cylindrical body portion of smaller diameter than the diameter of the bore in said valve disc to provide an annular chamber therebetween, said valve member having a radial flange formed integrally with said body at one side of said wall and said radial flange and wall having a restricted groove formed therebetween, said valve member formed with an axial bore, a valve stem extending through said bore and slidingly supporting said valve member, a valve retainer carried by said valve stem, spring means supported at one end by said valve retainer and acting exteriorly upon said valve member and urging said flange into seating engagement with said valve disc at one side thereof, means interconnecting said valve stem and said valve disc, second spring means acting upon said valve stem to releasably hold said valve disc in engagement with the valve seat in said partition wall, said valve member having a second radial flange integrally formed with the body thereof and spaced axially from said first mentioned flange a distance such that when said first flange is in engagement with one side of said valve disc, said second flange is spaced a predetermined distance outwardly from the opposite side of said valve disc to provide fluid communication past said second flange into the annular chamber between said valve member body and said valve disc with said communication being variably controlled as said second flange is moved toward said valve disc upon movement of said valve member against the action of said spring means.

References Cited in the file of this patent

UNITED STATES PATENTS

| | | |
|---|---|---|
| 832,619 | Nash | Oct. 9, 1906 |
| 1,497,063 | Brehmer | June 10, 1924 |
| 2,087,350 | McCann | July 20, 1937 |
| 2,111,991 | Richard | Mar. 22, 1938 |
| 2,179,460 | White | Nov. 7, 1939 |
| 2,538,375 | Montgomery | Jan. 16, 1951 |
| 2,691,387 | Strauss | Oct. 12, 1954 |

FOREIGN PATENTS

| | | |
|---|---|---|
| 17,860 | Great Britain | Aug. 12, 1896 |
| 1,036,217 | France | Apr. 22, 1953 |
| 1,074,758 | France | Apr. 7, 1954 |